ized Patent No.: US 12,210,410 B2

(12) United States Patent (10) Patent No.: US 12,210,410 B2
Ito et al. (45) Date of Patent: Jan. 28, 2025

(54) TRANSFER PROCESSING DEVICE

(71) Applicant: Nippon Telegraph and Telephone Corporation, Tokyo (JP)

(72) Inventors: Tsuyoshi Ito, Tokyo (JP); Kenji Tanaka, Tokyo (JP); Yuki Arikawa, Tokyo (JP); Kazuhiko Terada, Tokyo (JP); Tsutomu Takeya, Tokyo (JP); Takeshi Sakamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 15 days.

(21) Appl. No.: 18/254,974

(22) PCT Filed: Dec. 10, 2020

(86) PCT No.: PCT/JP2020/046027
§ 371 (c)(1),
(2) Date: May 30, 2023

(87) PCT Pub. No.: WO2022/123721
PCT Pub. Date: Jun. 16, 2022

(65) Prior Publication Data
US 2024/0045674 A1 Feb. 8, 2024

(51) Int. Cl.
*G06F 11/10* (2006.01)
*G06F 9/50* (2006.01)

(52) U.S. Cl.
CPC ............ *G06F 11/1044* (2013.01); *G06F 9/50* (2013.01)

(58) Field of Classification Search
CPC .................................. G06F 11/1044; G06F 9/50
See application file for complete search history.

(56) References Cited

U.S. PATENT DOCUMENTS

2005/0138237 A1* 6/2005 Reinberg .............. G06F 13/102
710/33
2020/0293473 A1* 9/2020 Kaneko ................. G06F 9/3836

FOREIGN PATENT DOCUMENTS

JP 2018036947 A 3/2018

* cited by examiner

*Primary Examiner* — April Y Blair
*Assistant Examiner* — Jeffrey Andrew Yang
(74) *Attorney, Agent, or Firm* — Slater Matsil, LLP

(57) ABSTRACT

A transfer processing device includes an arithmetic instruction number acquisition circuit, a buffer circuit, a transfer information acquisition circuit, and a software processing unit. The arithmetic instruction number acquisition circuit acquires a transfer instruction number corresponding to transfer information which is information related to the next transfer destination of an arithmetic instruction. The buffer circuit is arranged between the arithmetic instruction number acquisition circuit and the transfer information acquisition circuit, and temporarily stores and relays the arithmetic instruction and the arithmetic instruction number supplied from the arithmetic instruction number acquisition circuit to the transfer information acquisition circuit. The transfer information acquisition circuit acquires transfer information on the basis of the arithmetic instruction number, and gives the acquired transfer information to the arithmetic instruction. The buffer circuit holds the arithmetic instruction number and the arithmetic instruction until an output request from the transfer information acquisition circuit is received.

14 Claims, 5 Drawing Sheets

TRANSFER PROCESSING DEVICE

CROSS-REFERENCE TO RELATED APPLICATIONS

This application is a national phase entry of PCT Application No. PCT/JP2020/046027, filed on Dec. 10, 2020, which application is hereby incorporated herein by reference.

TECHNICAL FIELD

The present invention relates to a transfer processing device for performing processing for transferring an arithmetic instruction.

BACKGROUND

In recent years, advanced services using virtual reality or artificial intelligence have been developed on the Internet. In such a situation, in order to flexibly cope with advanced services, a technique for constructing a virtual computer on software by using a plurality of high-performance computer resources has been developed (refer to PTL 1). In such the virtual computer, a plurality of arithmetic instructions is executed in a distributed manner by a plurality of physical machines (distributed computers). At this time, the arithmetic instruction is transferred from a certain physical machine to another physical machine.

CITATION LIST

Patent Literature

PTL 1 Japanese Patent Application Publication No. 2018-36947

SUMMARY

Technical Problem

Here, the arithmetic instructions are transferred by the transfer processing circuit so as to be transferred at high speed, but there are various arithmetic instructions transferred by the virtual computer, and there are cases where software processing is required for the transfer processing circuit. Such software processing includes, for example, recovery from a soft error of a table held by the transfer processing circuit, update of the table held by the transfer processing circuit, and the like. Here, since processing speed of the software processing is generally slower than that of the transfer processing circuit, the software processing may not follow the transfer processing of the arithmetic instruction. In this case, the transfer processing of the arithmetic instruction is not normally performed, and erroneous transfer of the arithmetic instruction occurs.

An object of embodiments of the present invention is to prevent erroneous transfer due to timing deviation between software processing and transfer processing of an arithmetic instruction.

Solution to Problem

In order to solve the above problem, the transfer processing device according to embodiments of the present invention includes an arithmetic instruction number acquisition circuit configured to acquires an arithmetic instruction identifier for identifying an arithmetic instruction to be transferred, acquires the arithmetic instruction number corresponding to the acquired arithmetic instruction identifier from an arithmetic instruction identifier table having a plurality of combinations of the arithmetic instruction identifier and the arithmetic instruction number, and output the acquired arithmetic instruction number together with the arithmetic instruction, a transfer information acquisition circuit configured to acquire the arithmetic instruction number and the arithmetic instruction outputted from the arithmetic instruction number acquisition circuit, acquire the transfer information corresponding to the inputted arithmetic instruction number from a transfer information table having a plurality of combinations of the arithmetic instruction number and the transfer information, and output the acquired transfer information together with the arithmetic instruction, a software processing unit for executing a software processing for the transfer information acquisition circuit, a buffer circuit, which is a buffer circuit arranged between the arithmetic instruction number acquisition circuit and the transfer information acquisition circuit and relays the arithmetic instruction number and the arithmetic instruction, configured to hold the arithmetic instruction number and the arithmetic instruction while the software processing is executed, and output to the transfer information acquisition circuit after the software processing is completed.

Advantageous Effects of Embodiments of the Invention

According to embodiments of the present invention, erroneous transfer due to timing deviation between software processing and transfer processing of the arithmetic instruction can be prevented.

DETAILED DESCRIPTION OF ILLUSTRATIVE EMBODIMENTS

Hereinafter, a transfer processing device 10 of an arithmetic instruction according to an embodiment of the present invention will be described with reference to the drawings.

Entire Configuration of Transfer Processing Device of Arithmetic Instruction

Figure 1:
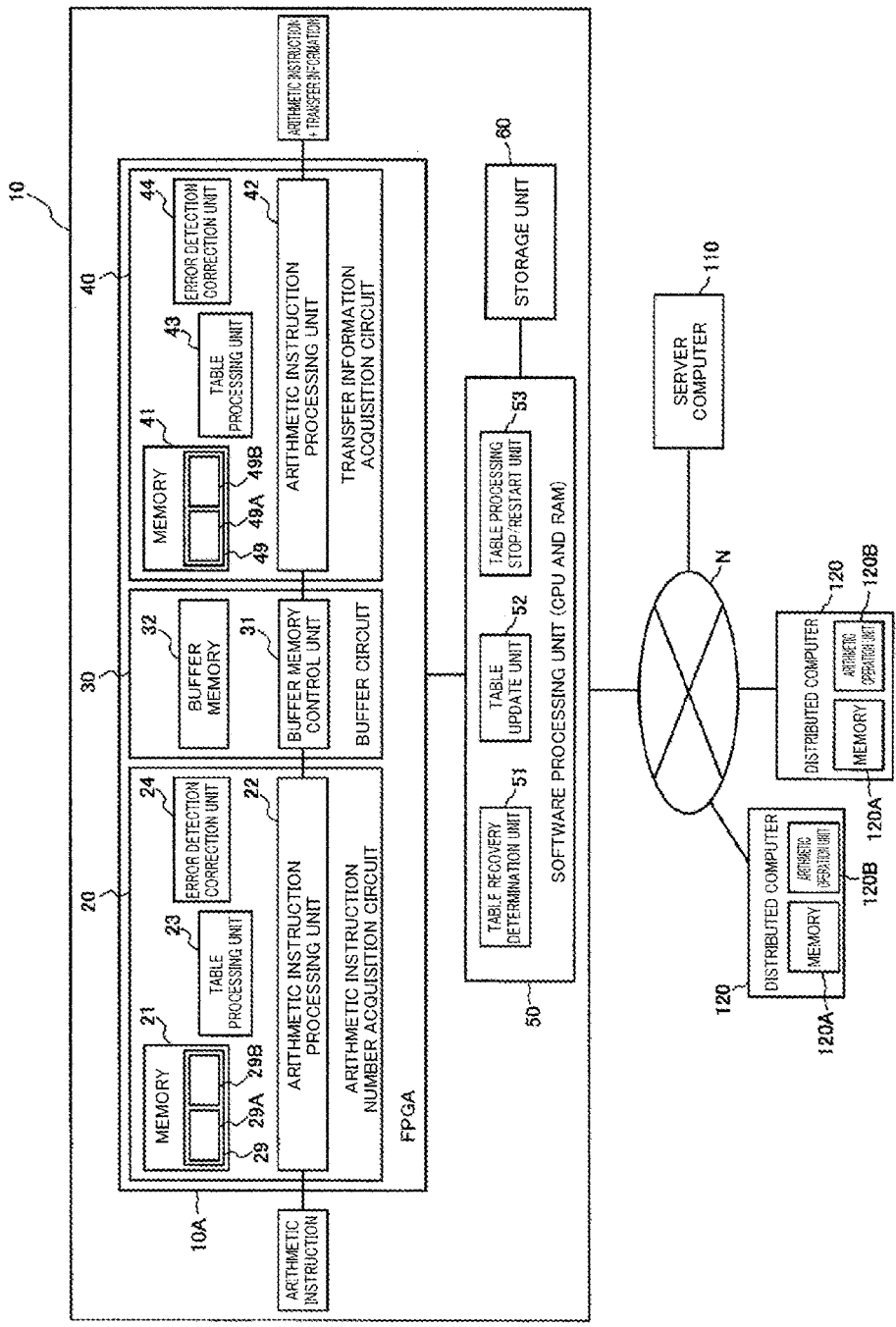
FIG. 1 is a configuration diagram showing of a transfer processing device according to an embodiment of the present invention.

As shown in FIG. 1, the transfer processing device 10 according the embodiment of the present invention is connected to a network N. The transfer processing device 10 is configured as one of a plurality of distributed computers constituting nodes of a virtual computer. The transfer processing device 10 is configured to communicate with a server computer 110 for controlling a predetermined calculation and a plurality of other distributed computers 120 via the network N. The transfer processing device 10, the server computer 110, and the plurality of other distributed computers 120 transmit and receive arithmetic instructions constituting software components to which distributed processing is performed, and execute the received arithmetic instruction.

As shown in FIG. 1, the transfer processing device 10 includes an arithmetic instruction number acquisition circuit 20, a buffer circuit 30, a transfer information acquisition circuit 40, a software processing unit 50 and a storage unit 60. The circuits 20 to 40 provided in the transfer processing device 10 constitute the transfer processing circuit 10A for performing processing for transferring the arithmetic instruction. The transfer processing circuit 10A is constituted of an FPGA (Field Programmable Gate Array), and each of the circuits 20 to 40 is constituted of a part of the FPGA. The transfer processing circuit 10A may be constituted of a logic circuit or the like other than the FPGA. The software processing unit 50 is composed of a CPU for executing a program stored in the storage unit 60, and a RAM which is a main memory of the CPU.

The arithmetic instruction received by the transfer processing device 10 from the server computer 110 or another distributed computer 120 is inputted to the arithmetic instruction number acquisition circuit 20. The arithmetic instruction number acquisition circuit 20 acquires a transfer instruction number corresponding to transfer information which is information related to the next transfer destination of the arithmetic instruction (for example, a port number for transmitting the arithmetic instruction, and/or a destination address of the arithmetic instruction). The buffer circuit 30 is arranged between the arithmetic instruction number acquisition circuit 20 and the transfer information acquisition circuit 40, and temporarily stores and relays the arithmetic instruction and the arithmetic instruction number supplied from the arithmetic instruction number acquisition circuit 20 to the transfer information acquisition circuit 40. The transfer information acquisition circuit 40 acquires the transfer information on the basis of the arithmetic instruction number, and gives the acquired transfer information to the arithmetic instruction. The arithmetic instruction to which the transfer information is added is transmitted to the transfer destination indicated by the transfer information by a communication device such as a network card (not shown) based on the transfer information. When the transfer destination is the distributed computer 120, the arithmetic instruction is stored in the memory 120A of the distributed computer 120 and executed by the arithmetic operation unit 120B. The arithmetic operation unit 120 is included in a processor such as a CPU, and the memory 120A may be a cache memory or the like. A large number of arithmetic instructions are inputted to the transfer processing device 10, and the circuits 20 to 40 sequentially processes the arithmetic instructions.

Although details will be described later, when acquiring the transfer instruction number, the arithmetic instruction number acquisition circuit 20 refers to an arithmetic instruction identifier table 29 having a plurality of combinations of the arithmetic instruction identifier and the arithmetic instruction number based on the arithmetic instruction. The arithmetic instruction identifier table 29 is stored in the memory 21 of the arithmetic instruction number acquisition circuit 20. The transfer information acquisition circuit 40 refers to a transfer information table 49 having a plurality of combinations of the arithmetic instruction number and the transfer information when acquiring the transfer information. The transfer information table 49 is stored in the memory 41 of the transfer information acquisition circuit 40. The software processing unit 50 manages the update of each of the tables 29 and 49 or the like.

Each of the circuits 20 to 40 performs processing by a logic circuit instead of performing processing in a form of executing a program. Such processing can be said to be hardware processing. On the other hand, the software processing unit 50 executes the program (the software) and performs processing. Such processing is software processing. The processing speed of the hardware processing is faster than the processing speed of the software processing. The buffer circuit 30 holds the arithmetic instruction or the like for a predetermined period so as to absorb a difference in processing speed between the hardware processing and the software processing. For example, the buffer circuit 30 is configured so as not to output the arithmetic instruction or the like to the transfer information acquisition circuit 40 until the update of the transfer information table 49 by the software processing unit 50 is completed.

Arithmetic Instruction

The configuration of the arithmetic instruction is arbitrary. The arithmetic instruction includes an 8-byte internal processor composed of a top header and the like, and an arithmetic instruction main body indicating the content (data) of the arithmetic instruction. It is assumed that the internal processor includes information such as an address of the computer of the transmission source of the arithmetic instruction and the length of the whole arithmetic instruction. The arithmetic instruction main body is a RISC arithmetic instruction of 32 bits=4 bytes or the like.

Arithmetic Instruction Number Acquisition Circuit 20

As shown in FIG. 1, the arithmetic instruction number acquisition circuit 20 includes a memory 21, an arithmetic instruction processing unit 22, a table processing unit 23, and an error detection correction unit 24.

The memory 21 stores the above-mentioned arithmetic instruction identifier table 29. The arithmetic instruction identifier table 29 is made redundant into two tables of the same contents, a main first table 29A and a sub second table 29B for the purpose of preventing the soft error. In each of the first table 29A and the second table 29B, arithmetic instruction numbers are associated with the plurality of arithmetic instruction identifiers, respectively. In this case, the order of the rows of the arithmetic instruction identifiers in the tables 29A and 29B is the arithmetic instruction number. For example, the arithmetic instruction number corresponding to the arithmetic instruction identifier of the 51-th row is 51. The arithmetic instruction number also corresponds to the row of the transfer information table 49. Therefore, the arithmetic instruction number is associated with the transfer information. The arithmetic instruction identifier is acquired on the basis of the arithmetic instruction, and identifies the arithmetic instruction. The arithmetic instruction number is set for each arithmetic instruction identifier and corresponds to one pieces of transfer information.

The memory 21 may include a CAM (Content Addressable Memory), and the arithmetic instruction identifier table 29 may be stored in the CAM. In this case, the arithmetic instruction number is the address of the memory 41 of the transfer information corresponding to the arithmetic instruction number in the transfer information table 49 of the transfer information acquisition circuit 40. With such a configuration, the acquisition of the transfer information is accelerated.

Figure 2:
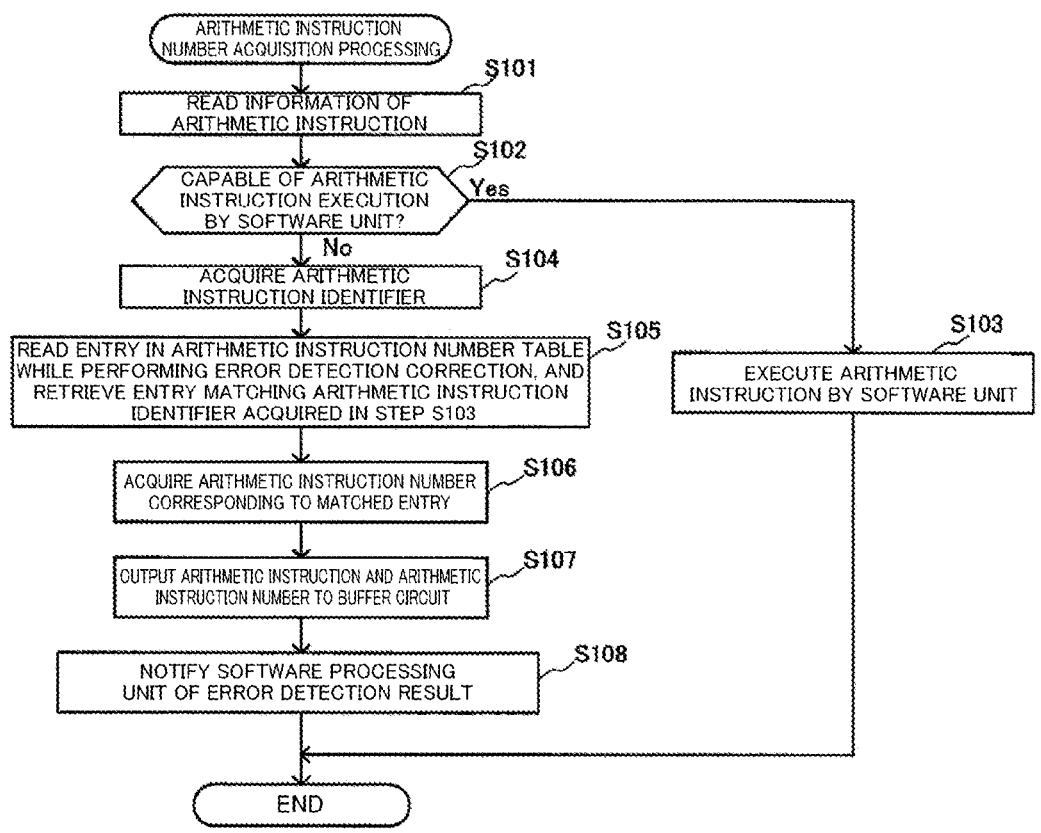
FIG. 2 is a flowchart of an arithmetic instruction acquisition processing executed by an arithmetic instruction number acquisition circuit of FIG. 1.

The arithmetic instruction processing unit 22, the table processing unit 23, and the error detection correction unit 24 cooperate to execute an arithmetic instruction number acquisition processing for acquiring the arithmetic instruction number shown in FIG. 2. The processing is started with the input of the arithmetic instruction to the arithmetic instruction number acquisition circuit 20 as a trigger.

In the arithmetic instruction number acquisition processing of FIG. 2, the arithmetic instruction processing unit 22 holds the inputted arithmetic instruction in its own RAM, and reads only a predetermined length of the arithmetic instruction from the top (step S101). Here, it is assumed that the arithmetic instruction consists of an 8-byte internal processor and a 32-bit RISC arithmetic instruction. The arithmetic instruction processing unit 22 reads information from the top to the twelfth byte of the arithmetic instruction, that is, reads the entire arithmetic instruction. The information to be read may be only a part of the information.

Thereafter, the arithmetic instruction processing unit 22 determines whether the software processing unit 50 can execute the arithmetic instruction or not (step S102). It is assumed that the arithmetic instruction processing unit 22 periodically communicates with the software processing unit 50 and monitors whether or not there is a surplus resource in the software processing unit 50. The arithmetic instruction processing unit 22 determines that the software processing unit 50 can execute the arithmetic instruction when there is a surplus resource in the software processing unit 50 (step S102; Yes). In this case, the arithmetic instruction processing unit 22 outputs the arithmetic instruction to the software processing unit 50, and makes the software processing unit 50 execute the arithmetic instruction (step S103). When the type of the arithmetic instruction executable by the software processing unit 50 is limited, the arithmetic instruction processing unit 22 may determine whether or not the software processing unit 50 can execute the arithmetic instruction based on "opcode" or the like described later of the RISC arithmetic instruction.

When the software processing unit 50 cannot execute the arithmetic instruction (step S103; No), the arithmetic instruction processing unit 22 acquires the arithmetic instruction identifier for identifying the arithmetic instruction on the basis of the information read in the step S101 (step S104). The arithmetic instruction identifier includes information on a type of arithmetic operation of the arithmetic instruction and an address of a transmission source of the arithmetic instruction. In this embodiment, the transfer destination of the arithmetic instruction, that is, another distributed computer for executing the arithmetic instruction, is allocated in accordance with the type of the arithmetic operation and the address of the transmission source. Information on the type of arithmetic operation of the arithmetic instruction is acquired on the basis of the arithmetic instruction body. When the arithmetic instruction main body (RISC arithmetic instruction) is assumed to be "funct7 rs2 rs1 funct3 rd opcode", information of the type of the arithmetic operation of the arithmetic instruction is total 17 bits combining funct7, funct3 and opcode. Alternatively, the information on the type of the arithmetic operation of the arithmetic instruction may be information combining funct7, funct3 and lower 2 bits, lower 2 bits of the opcode and lower 5 bits of the opcode. For example, when the funct7 is 00, the funct3 is 00, and the opcode is 10011, the information of the type of the arithmetic operation is 000010011. The address of the transmission source is extracted from the internal identifier of the arithmetic instruction.

A step S105 after the step S104 is executed by a table processing unit 23 and an error detection correction unit 24. Specifically, the table processing unit 23 reads one by one an entry (an arithmetic instruction identifier) of the first table 29A which is the main table of the arithmetic instruction identifier table 29, and retrieves the entry matching the arithmetic instruction identifier acquired by the arithmetic instruction processing unit 22. Each entry of the arithmetic instruction identifier table 29 is managed in units of words, and an error detection correction code is added every entry. The error detection correction unit 24 performs error detection and correction processing to the entry every time the entry is read by the table processing unit 23. The error detection correction code is a countermeasure against the soft error caused by bit inversion caused by cosmic rays or the like.

As the case of the error detection result, it is considered that (1) no error detection, (2) error detection and correctable and (3) error detection and uncorrectable. For example, when the detection result of the first table 29A is (1), the table processing unit 23 collates the read entry with the arithmetic instruction identifier acquired by the arithmetic instruction processing unit 22. If both do not match, the table processing unit 23 reads the entry of the next row. In the case of the above-mentioned (2), the error detection correction unit 24 corrects an error of the entry by the error detection correction code, and the table processing unit 23 collates the corrected entry with the arithmetic instruction identifier. If both do not match, the table processing unit 23 reads the entry of the next row. In the case of the above-mentioned (3), the table processing unit 23 reads the entry of the second table 29B, and the error detection correction unit 24 detects the error for the entry. The case of the result of the detection is the same as the above-mentioned (1) to (3). In the above-mentioned (1) and (2), the entry or the corrected entry is collated with the arithmetic instruction identifier. In the case of the above-mentioned (3), the table processing unit 23 stops the collating between the currently read entry and the arithmetic instruction identifier, and reads the next entry.

Although not shown in the figure, the error detection correction unit 24 holds the result of the error detection performed above in a RAM or the like provided in the error detection correction unit 24 for each entry separately in the first table 29A and the second table 29B. As the result, the above-mentioned (1) to (3) exist.

After the step S105, the table processing unit 23 acquires the arithmetic instruction number corresponding to the entry when the arithmetic instruction identifier acquired by the arithmetic instruction processing unit 22 and the entry match each other (step S106). For example, if the arithmetic instruction identifier 000010011 coincides with the 512-th row of the first table, the 512-th line is obtained as the arithmetic instruction number. Thereafter, the arithmetic instruction processing unit 22 outputs the arithmetic instruction and the arithmetic instruction number acquired in the step S106 to the buffer circuit 30 (step S107). The arithmetic instruction number may be outputted in a state of being put in a predetermined area of the internal processor.

Thereafter, the error detection correction unit 24 notifies the software processing unit 50 of the result of the error detection held in the RAM or the like (step S108). The software processing unit 50 receives the notification and updates the arithmetic instruction identifier table, etc. (detail will be described later).

As described above, the error detection correction code is given to each entry of the arithmetic instruction identifier table, and the arithmetic instruction identifier table is duplicated, so that in this embodiment, a countermeasure is taken against the soft error of bit inversion due to cosmic rays. Although there are some error detection correction codes, in this embodiment, an error having a small frequency of bit inversion due to cosmic rays is targeted, so that a SECDED (single error correction and double error detection) for correcting a single error and detecting double error is used for error detection and correction. Thus, error correction can be efficiently performed without increasing the circuit impact.

Buffer Circuit 30

Figure 3:
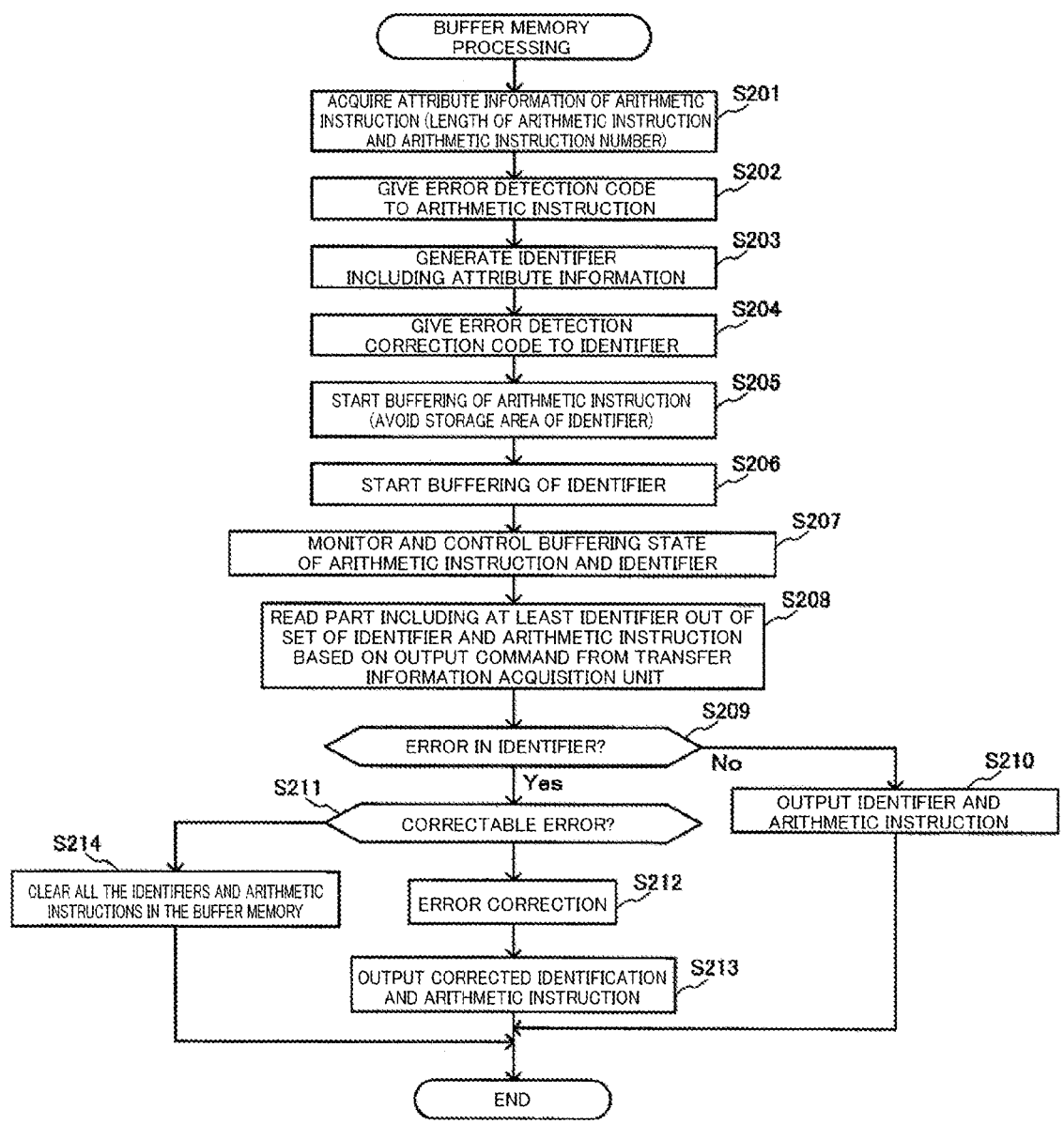
FIG. 3 is a flowchart of buffer memory processing executed by a memory buffer circuit of FIG. 1.

As shown in FIG. 1, the buffer circuit 30 includes a buffer memory control unit 31 and a buffer memory 32. The buffer memory control unit 31 executes the buffer memory processing shown in FIG. 3 to control the buffer memory 32 to hold the arithmetic instruction number and the arithmetic instruction outputted by the arithmetic instruction processing unit 22 until the output request from the transfer information acquisition circuit 40 is received.

In the buffer memory processing, the buffer memory control unit 31 first acquires attribute information of the arithmetic instruction on the basis of the arithmetic instruction number and the arithmetic instruction outputted by the arithmetic instruction number acquisition circuit 20 (step S201). Here, the attribute information is composed of the arithmetic instruction number and the length of the arithmetic instruction included in the top internal processor of the arithmetic instruction. Hereinafter, the arithmetic instruction number is set to G1, the length of the arithmetic instruction is set to G2, and the arithmetic instruction is set to F.

Thereafter, the buffer memory control unit 31 calculates an error detection code for the whole arithmetic instruction F so as to detect the error when the error is superimposed on the arithmetic instructions F, and gives the calculated error detection code to the end of the arithmetic instruction F (step S202). In this example, the CRC8 (Cyclic Redundancy Check 8) is given as the error detection code. The error detection code is not limited to the CRC8, but various similar error detection code formats can be adapted. The error detection code may be a correctable error detection correction code. In the following description, the error detection code is included as the arithmetic instruction F. A length G2 of the arithmetic instruction in the internal processor is corrected to the length G2 obtained by adding the error detection code of the end.

Thereafter, the buffer memory control unit 31 generates an identifier for associating attribute information (G1, G2) of the arithmetic instruction F obtained in the step S201 with the arithmetic instruction F (step S203). This identifier is information which is arranged before the arithmetic instruction F and identifies the arithmetic instruction F. The buffer memory control unit 31 prepares the identifier of a fixed length and embeds the attribute information (G1, G2) in the identifier. In this case, it is preferable to determine in advance an area in the identifier to which the attribute information (G1, G2) is assigned. By embedding the attribute information (G1, G2) of the input arithmetic instruction in the identifier, the inputted arithmetic instruction F is associated with the attribute information of the input arithmetic instruction (G1, G2). Thereafter, the identifier generated in the step S203 is defined as S.

Thereafter, the buffer memory control unit 31 calculates the error detection correction code for the entire identifier S so that the generated identifier S can be error-detected and corrected, and embeds the calculated error detection correction code in a specific area in the identifier S, for example, [23: 16] which does not affect the length of the arithmetic instruction and the arithmetic instruction number (step S204). For example, if the SECDED code is applied as the error detection correction code, it is possible to cover the error pattern of the soft error actually occurring. The error detection correction code may be a code for directing only the length of the arithmetic instruction and the arithmetic instruction number of the identifier S. In this case, the error detection correction of the identifier S, which will be described later, is directed only to the length of the arithmetic instruction and the arithmetic instruction number of the identifier S.

Thereafter, the buffer memory control unit 31 starts buffering the arithmetic instruction F to the buffer memory 32 (step S205). In the preceding step S204, since the identifier S is generated on the basis of the length G2 of the arithmetic instruction F acquired from the arithmetic instruction F and the arithmetic instruction number G1, buffering of the identifier S to the buffer memory 32 may be delayed more than the arithmetic instruction F. In the step S205, an area for buffering the identifier S is secured in the buffer memory 32 before buffering the arithmetic instruction F. Then, the arithmetic instruction F is stored in the buffer memory 32 while avoiding the secured area. The area for the identifier S is an area whose read order is higher than that of the arithmetic instruction F.

Thereafter, the buffer memory control unit 31 starts buffering the identifier S in the area secured in the buffer memory 32 (step S206).

Thereafter, the buffer memory control unit 31 monitors and controls the buffering state of the arithmetic instruction F and the identifier S (step S207). More specifically, the buffer memory control unit 31 monitors whether or not the identifier S and the arithmetic instruction F are all stored in the buffer memory 32. After the identifier S and the arithmetic instruction F are stored in the buffer memory, the buffer memory control unit 31 holds the stored identifier S and the arithmetic instruction F in the buffer memory 32 until the output instruction of the identifier S and the arithmetic instruction F in the post-process is given.

The transfer information acquisition circuit 40 issues an output command of a set of one identifier S and arithmetic instruction F to the buffer circuit 30 at an appropriate timing. The buffer memory control unit 31 waits until the output command is received, and when the output command is received, reads a part including at least the whole identifier S out of the set of the identifier S and the arithmetic instruction F from the buffer memory 32 (step S208). The buffer memory 32 is of the FIFO (first in first out) system, and when an output command is issued, the data is outputted from the identifier S stored first in the buffer memory 32. In other words, when the arithmetic instruction F is outputted, the identifier S held in the preceding area is first outputted. In this case, when the bit width of the buffer memory 32 is larger than the number of bits of the identifier S and the identifier S is stored from the top of the first layer of the buffer memory 32, If only the first layer of the buffer memory 32 is taken out, all the identifiers S are included in the read information.

After the identifier S is read, the buffer memory control unit 31 reads the error detection correction code (SECDED code) embedded in the identifier S, and determines whether there is an error in the identifier S by using the read error detection correction code (step S209). When there is no error (step S209; No), it is guaranteed that the identifier S is correct information. In this case, the buffer memory control unit 31 reads the remaining arithmetic instruction F from the buffer memory 32, and outputs the identifier S and the entire arithmetic instruction F to the transfer information acquisition circuit 40 (step S210). The remainder of the arithmetic instruction F is specified by the length information of the arithmetic instruction F included in the identifier S.

When the error is detected for the identifier S (step S209; Yes), the buffer memory control unit 31 determines whether the detected error is correctable (step S211). In this case, if there is one bit error in the identifier S due to the soft error or the like, the error can be corrected. If there are double or more bit errors in the identifier S due to the soft error or the like, the error cannot be corrected.

When the error of the identifier S is correctable (step S211; Yes), the buffer memory control unit 31 performs the error detection and correction of the identifier S (step S212). By this error detection correction, it is ensured that the identifier S read from the buffer memory 3 is correct information without errors. Thereafter, the buffer memory control unit 31 reads the remaining arithmetic instruction F from the buffer memory 32, and outputs the corrected identifier S and the arithmetic instruction F to the transfer information acquisition circuit 40 (step S213).

When the error of the identifier S is uncorrectable (step S211; No), the length G2 of the arithmetic instruction and the arithmetic instruction number G1 in the identifier S are not reliable. In particular, when the length G2 of the arithmetic instruction is wrong, when another arithmetic instruction is stored in the buffer memory 32, the boundary between the end of the arithmetic instruction F and the top of the identifier S of the other arithmetic instruction becomes unclear, and all the arithmetic instructions F to be sequentially processed are erroneously processed. Therefore, when the error of the identifier S cannot be corrected, the buffer memory control unit 31 clears (discards) all the arithmetic instruction and the identifier stored in the buffer memory 32 at present (step S214). At this time, the buffer memory control unit 31 may clear (discard) the arithmetic instruction in the middle of reading from the buffer memory 32 and the arithmetic instruction in the middle of storing in the buffer memory 32. When the arithmetic instruction and the identifier are fixed in length, only the arithmetic instruction corresponding to the identifier to be processed may be discarded.

According to the series of processing described above, the buffer memory control unit 31 can acquire the correct identifier S and the arithmetic instruction F by a simple processing such as reading only the first layer of the buffer memory 32 instead of reading the arithmetic instruction F to the end of the operation instruction F from the buffer memory 32.

Also, even if the bit error which can be detected and corrected due to the soft error occurs, the processing for the arithmetic instruction is not stopped by simple processing for correcting errors of the length G2 of the arithmetic instruction and the arithmetic instruction number G1, and the processing can be performed.

Further, when there is the error which cannot be corrected by the implemented error detection correction, the arithmetic instruction or the like in the buffer memory 32 is discarded, so that the influence on the subsequent arithmetic instruction processing can be suppressed only by sacrificing the arithmetic instruction stored in the buffer memory 32.

Transfer Information Acquisition Circuit 40

As shown in FIG. 1, the transfer information acquisition circuit 40 includes a memory 41, an arithmetic instruction processing unit 42, a table processing unit 43, and an error detection correction unit 44.

The memory 41 stores the transfer information table 49 described above. The transfer information table 49 is made redundant into two tables of the same contents, that is, a first main table 49A and a second sub table 49B, for the purpose of the soft error countermeasure. Each entry of the transfer information table 49 is managed in units of words, and the error detection correction code is added to each entry. In the transfer information table 49, that is, in the first and second tables 49A and 49B of the master and slave, a plurality of arithmetic instruction numbers is made to correspond to a plurality of pieces of transfer information, respectively. In this case, the order of the rows of the transfer information in the first and second tables 49A and 49B of the master and slave is the arithmetic instruction number. For example, the arithmetic instruction number corresponding to the transfer information of the 51-th row is 51.

Figure 4:
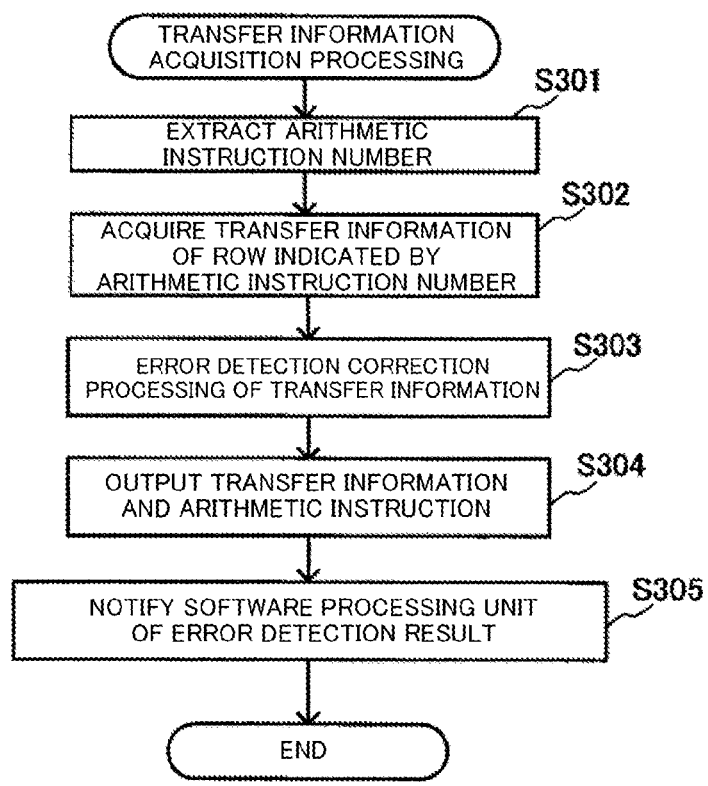
FIG. 4 is a flowchart of a transfer information acquisition processing executed by a transfer information acquisition circuit of FIG. 1.

The arithmetic instruction processing unit 42, the table processing unit 43, and the error detection correction unit 44 cooperate to execute the transfer information acquisition processing shown in FIG. 4. The transfer information acquisition circuit 40 supplies an output command of the arithmetic instruction to the buffer circuit 30 at an arbitrary timing when software processing described later by the software processing unit 50 is not executed. The transfer information acquisition processing is started upon input of the identifier S and the arithmetic instruction F from the buffer circuit 30 to the transfer information acquisition circuit 40 in response to the output command as a trigger.

In the transfer information acquisition processing, the arithmetic instruction processing unit 42 holds the identifier S and the arithmetic instruction F in its own RAM, and extracts the arithmetic instruction number included in the identifier S (step S301). The arithmetic instruction processing unit 42 may first perform error detection correction processing by using the error detection correction code included in the identifier S. The arithmetic instruction processing unit 42 may perform error detection by the error detection code at the end of the arithmetic instruction F.

Thereafter, the table processing unit 43 acquires the transfer information stored in the row indicated by the arithmetic instruction number from the first table 49A of the transfer information table 49 (step S302). For example, when the arithmetic instruction number indicates 512-th row, the 512-th transfer information is obtained. Thereafter, the error detection correction unit 44 performs the error detection and correction processing of the transfer information on the basis of the error detection correction code added to the acquired transfer information (step S303). As the result of the error detection, there are cases of (1) no error detection, (2) error detection and correctable and (3) error detection and uncorrectable. In the case of the above-mentioned (1), the transfer information is used as it is after the step S304. In the case of the above-mentioned (2), the error detection correction unit 44 corrects the error. In this case, the transfer information after correction is used after the step S304. In the case of the above-mentioned (3), the table processing unit 43 refers to the second table 49B to acquire the transfer information, and performs error detection correction or the like in the same manner as described above. Note that when the error detection correction unit 44 detects the uncorrectable error in the transfer information read from the second table 49B, the transfer information acquisition processing is stopped.

Although not shown in the figure, the error detection correction unit 44 holds the result of the error detection performed above in a RAM or the like provided in the error detection correction unit 44 for each entry separately in the first table 49A and the second table 29B. As the result, the above-mentioned (1) to (3) exist.

The arithmetic instruction processing unit 42 gives the transfer information acquired by the table processing unit 43 or corrected by the error detection correction unit 44 to the arithmetic instruction F as information indicating the transfer destination of the arithmetic instruction F, and outputs the transfer information and the arithmetic instruction F (step S304). The arithmetic instruction processing unit 42 may also output the identifier S in addition to the transfer information and the arithmetic instruction F.

Thereafter, the error detection correction unit 44 notifies the software processing unit 50 of the result of the error detection held in the RAM or the like (step S305). The software processing unit 50 receives the notification and updates the arithmetic instruction identifier table, etc. (detail will be described later).

As described above, the error detection correction code is given to each entry of the transfer information table, and the table is duplicated, in this embodiment, a countermeasure is taken against the soft error of bit inversion due to cosmic rays. In the same manner as above, for error detection correction, the SECDED for performing single error correction and double error detection is used. Thus, error correction can be efficiently performed without increasing the circuit impact.

Software Processing Unit 50

As shown in FIG. 1, the software processing unit 50 includes a table recovery determination unit 51, a table update unit 52, and a table processing stop/restart unit 53. When the error is detected in the entries of the arithmetic instruction identifier table 29 and the transfer information table 49, the entry is recorded in advance in each table, and therefore this error may be the bit inversion due to the soft error. Then, the software processing unit 50 performs processing for recovering the table by the above-mentioned units 51 to 53.

The table recovery determination unit 51 counts the number of times of finding out a result of error detection (whether or not correction is possible does not matter) for each entry of the arithmetic instruction identifier table 29 based on the error detection result (step S108) notified from the error detection correction unit 24 of the arithmetic instruction number acquisition circuit 20 every time the arithmetic instruction is processed. The count value is tabulated for each entry and held. By such processing, the accuracy, i.e., the quality of the entry of the arithmetic instruction identifier table 29 is monitored.

The table recovery determination unit 51 counts the number of times of occurrence of the result of error detection (whether or not correction is possible does no matter) for each entry of the transfer information table 49 based on the transfer information (step S305) notified from the error detection correction unit 44 of the transfer information acquisition circuit 40 every time the arithmetic instruction is processed. The count value is tabulated for each entry and held. By such processing, the accuracy, i.e., the quality of the entry of the transfer information table 49 is monitored.

The table recovery determination unit 51 determines whether or not the count value of a certain entry exceeds a predetermined threshold value every time the notification (step S108 or S305) is present. When it is determined that the count value exceeds the threshold value, the table recovery determination unit 51 determines that the table recovery processing shown in FIG. 5 is performed for the table to which the entry belongs.

When the error is detected, since an entry is written in advance in the table, there is a possibility of bit inversion due to the soft error.

The table recovery processing in the case where the count value for the entry of the transfer information table 49 exceeds the predetermined threshold value will be described below.

Figure 5:
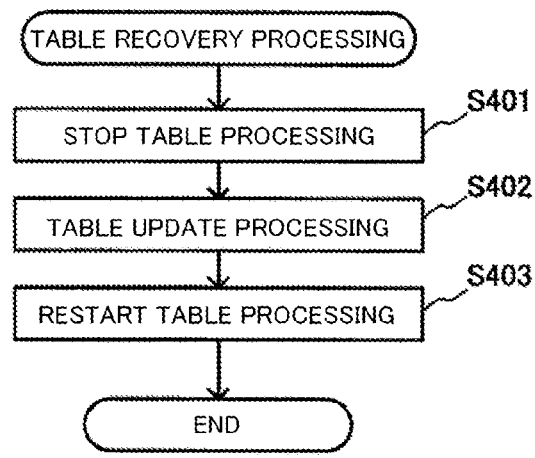
FIG. 5 is a flowchart of table recovery processing executed by a software processing unit of FIG. 1.

In the table recovery processing shown in FIG. 5, first, the table processing stop/restart unit 53 instructs the transfer information acquisition circuit 40 handling the transfer information table 49 which is an object of the table recovery processing at this time to stop the table processing (step S401). The table processing is processing for referring to the transfer information table 49, and is the step S302 in FIG. 4. When receiving the instruction, the transfer information acquisition circuit 40 stops the processing when the processing of the step S302 is being performed. When the object of the table recovery processing is the arithmetic instruction identifier table 29, the table processing is steps S105 and S106 in FIG. 2.

After the step S401, the table update unit 52 updates the table to which the entry whose count value exceeds the predetermined threshold value belongs among the first table 49A and the second table 49B of the transfer information table 49 (step S402). The table update unit 52 may rewrite only the entry exceeding the threshold value to correct data or the whole of the first table 49A or the second table 49B in updating. The table update unit 52 may update both the first table 49A and the second table 49B. The data necessary for updating may be acquired from the storage unit 60 or the server computer 110, for example.

When the update is finished, the table processing stop/restart unit 53 instructs the transfer information acquisition circuit 40 to start the table processing (step S403). When receiving the instruction and the processing of the step S302 is being stopped, the transfer information acquisition circuit 40 restarts the processing.

The software processing unit 50 communicates with the arithmetic instruction number acquisition circuit 20 or the transfer information acquisition circuit 40, and can rewrite an entry having an error, that is, having bit inversion, to a normal entry each time the error is detected as described above. However, since the above-mentioned tables 29 and 49 are retrieved at a high speed, it is desired to reduce the above-mentioned rewriting processing as much as possible. Therefore, in the arithmetic instruction number acquisition circuit 20 or the transfer information acquisition circuit 40, when the error is detected for a certain entry once, the table processing unit 23 or 43 holds the information in a table such as a RAM, and in the next and subsequent retrieval, the retrieval may be performed while avoiding the entry in which the error is detected. Thus, the efficiency of retrieval, that is, the processing delay for retrieval can be reduced.

When the retrieval result is accumulated for a large number of arithmetic instructions and the retrieval of the entry becomes impossible due to the accumulation of the soft error, an affection such as the stop of the processing in the arithmetic instruction number acquisition circuit 20 or the transfer information acquisition circuit 40 may be considered. As described above, the table recovery determination unit 51 monitors the state of error detection of the entire entry and determines the recovery of the table with the threshold value, thereby preventing the occurrence of adverse effects such as the stop of the processing.

The object to be counted by the table recovery determination unit 51 is not the result of error detection, but may be only the case where error detection is present and the error cannot be corrected. As a result, the processing delay can be reduced.

The software processing unit 50 may change the transfer destination (transfer information) defined by the arithmetic instruction identifier table 29 and the transfer information table 49 as appropriate. For example, it is assumed that the server computer 110 monitors the transfer processing device 10 and the distributed computer 120 and manages to which computer what arithmetic instruction is to be transferred. In this case, the server computer 110 instructs the software processing unit 50 to update the contents of the tables 29 and 49 defining the transfer destination of the arithmetic instruction according to the situation. The software processing unit 50 updates the contents of the tables 29 and 49 by performing software processing to the arithmetic instruction number acquisition circuit 20 or the transfer information acquisition circuit 40 by the table update unit 52 or the like on the basis of the instruction. Also in this case, the table processing in the arithmetic instruction number acquisition circuit 20 or the transfer information acquisition circuit 40 is appropriately stopped. By updating the contents of the tables 29 and 49, for example, when the server computer 110 detects that a certain distributed computer 120 cannot execute the distributed processing, the distributed computer 120 can be excluded from the candidates of the transfer destination.

Effects of Embodiments and the Like

As described above, the software processing unit 50 performs software processing on the arithmetic instruction number acquisition circuit 20 or the transfer information acquisition circuit 40 for recovering or updating the table. At this time, especially, in the transfer information acquisition circuit 40, while the software processing is executed, the transfer processing which is hardware processing for transferring the arithmetic instruction (the step S302 in FIG. 4 referring to the transfer information table 49, etc.) is stopped, and thus, the transfer processing is delayed by software processing. If the buffer circuit 30 is not provided, the arithmetic instruction is inputted to the transfer information acquisition circuit 40 from the arithmetic instruction number acquisition circuit 20 even while the transfer processing in the transfer information acquisition circuit 40 is stopped and software processing is performed. In such a case, the arithmetic instruction to be processed by the transfer information acquisition circuit 40 at present is mixed with the arithmetic instruction inputted later, and the transfer processing of the arithmetic instruction is not normally performed, and the arithmetic instruction is transferred together with other arithmetic instruction not intended to a desired destination, and an inconvenience such as the erroneous transfer of the arithmetic instruction may occur. In this embodiment, the buffer circuit 30 is provided between the arithmetic instruction number acquisition circuit 20 and the transfer information acquisition circuit 40. Then, the buffer circuit 30 does not output the arithmetic instruction held at that time until an output instruction is given from the transfer information acquisition circuit 40. Thus, the buffer circuit 30 is configured to output the arithmetic instruction number and the arithmetic instruction outputted from the arithmetic instruction number acquisition circuit 20 after the software processing to the transfer information acquisition circuit 40 is completed. Thus, since the software processing does not follow the transfer processing of the arithmetic instruction, the transfer processing of the arithmetic instruction is not normally performed and the inconvenience such as the erroneous transfer of the arithmetic instruction is prevented. That is, according to this embodiment, erroneous transfer due to a timing deviation between the software processing and the transfer processing of the arithmetic instruction is prevented. Thus, highly reliable transfer is realized.

Also, even if the error due to the soft error occurs in the entry of the table 29 or 49 referred to at the time of transfer of the arithmetic instruction, the table is duplicated and the error detection correction code is given for each entry (for example, in word units), the transfer processing device 10 has soft error resistance. In addition, rewriting of the entire table can be performed after the soft error is accumulated by the determination of whether or not the entire table needs to be recovered by the software processing unit 50, thereby avoiding table update during retrieval, the speed of the table processing is increased, and the processing delay can be reduced.

Further, the buffer circuit 30 gives the information (the identifier S) including the arithmetic instruction number and the error detection correction code before the arithmetic instruction F, and stores the arithmetic instruction after securing the storage area of the information when storing the arithmetic instruction F. Thus, since the identifier S as the information is read first at the time of reading the arithmetic instruction F, the error detection by the error detection correction code can be performed without reading out all the arithmetic instruction F. Therefore, the processing delay in the buffer circuit 30 is reduced, and an unnecessary buffer for writing the arithmetic instruction F is not required, and the circuit scale can be reduced.

The software processing unit 50 of this embodiment can also operate as the arithmetic instruction execution unit for acquiring the arithmetic instruction and executing the arithmetic instruction when the arithmetic instruction inputted to the transfer processing circuit 10A, that is, the arithmetic instruction number acquisition circuit 20 can be executed. Thus, the transfer processing device 10 can perform the distributed processing. The arithmetic instruction number acquisition circuit 20 acquires the arithmetic instruction number and outputs the acquired arithmetic instruction number together with the arithmetic instruction when the software processing unit 50 as the arithmetic instruction execution unit cannot execute the arithmetic instruction. Thus, the transfer processing device 10 can transfer the arithmetic instruction to another distributed computer 120 or the like when the arithmetic instruction cannot be executed. The arithmetic instruction execution unit may be constituted by a device other than the software processing unit 50. The arithmetic instruction execution unit may be constituted by a processor or the like for executing a program.

Modification Example and the Like

The present invention has been described thus far with reference to the embodiment, but the present invention is not limited to the above embodiment. Various modifications may be made to the above embodiment. Examples of modifications will be listed below, but at least some of the following modifications may be combined in a non-contradictory manner.

The internal processor of the arithmetic instruction may include a destination address of the distributed computer 120 for executing the arithmetic instruction. In this case, the arithmetic instruction identifier may include the destination address. In this case, the transfer information may be information indicating a transfer destination by designating a port connected to the network to which the distributed computer 120 having the destination address is connected. In this case, the arithmetic instruction outputted from the transfer information acquisition circuit 40 is transmitted from the transfer processing device 10 with the destination address included in the internal processor of the arithmetic instruction as the final transmission destination. The destination address may be acquired by the buffer circuit 30 and included in the identifier S instead of or in addition to the arithmetic instruction number. The arithmetic instruction number may be separately transmitted together with the arithmetic instruction F. The destination address may be assigned to a transmission source of the arithmetic instruction, a type of arithmetic operation of the arithmetic instruction, and the like. In this case, the buffer circuit 30 refers to, for example, a table, and acquires and uses the address of the transmission source included in the internal processor of the arithmetic instruction and the destination address assigned to a combination of the arithmetic instruction and the opcode or the like. In this case, the identifier S is also outputted from the transfer information acquisition circuit 40, and the arithmetic instruction outputted from the transfer information acquisition circuit 40 is transmitted from the transfer processing device 10 with the destination address included in the identifier S as a final transmission destination. Note that the internal processor of the arithmetic instruction may be appropriately deleted during the processing of the transfer processing device 10.

The destination address included in the internal processor of the arithmetic instruction, the destination address included in the identifier S, the destination address indicated by the transfer information, etc., may be set to a memory address that is an address of various memories 120A such as a cache memory, on chip memory, a DRAM memory that are accessed by the arithmetic operation unit 120B in the distributed computer 120 for executing the arithmetic instruction. The arithmetic operation unit 120B is included in a processor such as a CPU of the distributed computer 120. The various memories may be provided inside or outside the processor. As described above, it may be configured that the transfer information or the arithmetic instruction includes the memory address of the memory 120B accessed by the arithmetic operation unit executing the arithmetic instruction as the destination address, or the transfer information acquisition circuit 40 outputs the address as the destination address by the identifier S or the like separately from the transfer information or the arithmetic instruction. Since the arithmetic instruction is once stored in the memory 120A according to such the configuration, flexible and high-speed arithmetic processing can be performed, for example, even when a large number of arithmetic instructions are required to be executed. Further, since the address of the shared memory shared by the plurality of distributed computers 120 can be designated as the memory address and the arithmetic instruction (the data is included in the arithmetic operation) is once stored in the shared memory and can be use, many information processing, that is, the execution of the arithmetic instruction can be accurately performed.

The error detection correction includes a mode in which only error detection is performed. That is, then error detection code may be used as the error detection correction code. Any kind of code for error detection correction may be used. In the case of error detection, a parity code or a cyclic redundancy check code such as CRC may be used. In the case of error detection correction, a Reed-Solomon code may be used in addition to the SECDED which performs a single error correction and double error detection or the like.

The information included in the arithmetic instruction identifier may be a combination of header information such as an address of a destination or a transmission source and priority. The arithmetic instruction may have a configuration other than the configuration of the internal processor of 8 bytes at the top and the RISC arithmetic instruction of 32 bits. One arithmetic instruction may be a continuous instruction of a plurality of instructions following the 8-byte internal processor. The length of the internal processor and the arithmetic instruction is not limited to the above-described embodiment, and may be arbitrary. The internal processor may include not only the length information of the instruction but also the number of consecutive instructions, user ID information, and the like. The internal processor may directly include the arithmetic instruction identifier. In the above-mentioned various arithmetic operations or calculations, the value and the length of the VLAN (Virtual LAN) tag (priority degree) may be used, and which numerical value is to be used may be arbitrary.

The arithmetic instruction may not be the RISC arithmetic instruction, or may be an instruction having a large function such as an arithmetic instruction for performing image size conversion. The arithmetic instruction may be a unique arithmetic instruction which is not standardized. In addition, the arithmetic instruction may be stored in a request of a communication protocol, for example, http, from the distributed computer 120. The arithmetic instruction may be inputted to the transfer processing device 10 by various protocols such as an MQTT, a CoAP, a QUIC, a WebSocket, a NATS, a Kafka, a REST, and unique protocols. The arithmetic instruction transmitted from the transfer processing device 10 may also be transferred by various protocols as described above. The direction of transfer of the arithmetic instruction is not one direction but can be bi-direction. In addition, a plurality of distributed computers is connected to the transfer processing device 10. The transfer processing device 10 may be a variety of switches for relaying arithmetic instructions, a network card, and the like.

The recovery of the first table 29A or 49A by the software processing unit 50 may be performed at the timing of access to the second table 29B or 49B. Thus, the table can be made restoration without affecting the retrieval.

An entry error may be detected not only by the soft error but also by various factors such as noise. Errors may occur simultaneously and frequently in a plurality of entries. For example, an error area may spread to a physically close position of the memory. When errors are detected for a plurality of entries, the table update unit 52 may update the entire table. Further, the table recovery determination unit 51 may immediately recover the table when one error is detected in one entry. The table may be rewritten while dividing in a plurality of times. Thus, when the arithmetic instruction is within a time capable of storing the arithmetic instruction in the buffer, for example, within 1 m seconds, and when a buffer of about 1 KB is present in the case of video distribution of about 10 Mbps, the arithmetic delay can be minimized even when real time processing is required.

REFERENCE SIGNS LIST

10 Transfer processing device,
10A Transfer processing circuit
20 Arithmetic instruction number acquisition circuit
21 Memory 22 Arithmetic instruction processing unit
23 Table processing unit
24 Error detection correction unit
29 Arithmetic instruction identifier table,
29A First table,
29B Second table
30 Buffer circuit
31 Buffer memory control unit
32 Buffer memory
40 Transfer information acquisition circuit
41 Memory
42 Arithmetic instruction processing unit
43 Table processing unit
44 Error detection correction unit
49 Transfer information table,
49A First table,
49B Second table,
50 Software processing unit
51 Table recovery determination unit
52 Table update unit
53 Table processing stop/restart unit
60 Storage unit
110 Server computer
120 Distributed computer,
120A Memory,
120B Arithmetic operation unit,
N Network.

The invention claimed is:

1. A transfer processing device comprising:
an arithmetic instruction number acquisition circuit configured to:
  acquire an arithmetic instruction identifier identifying an arithmetic instruction to be transferred;
  acquire an arithmetic instruction number corresponding to the arithmetic instruction identifier from an arithmetic instruction identifier table correlating arithmetic instruction identifiers with arithmetic instruction numbers; and
  output the arithmetic instruction number with the arithmetic instruction;
a transfer information acquisition circuit configured to:
  acquire the arithmetic instruction number and the arithmetic instruction out from the arithmetic instruction number acquisition circuit;
  acquire transfer information corresponding to the arithmetic instruction number from a transfer information table correlating arithmetic instruction numbers with transfer information; and
  output the transfer information corresponding to the arithmetic instruction number with the arithmetic instruction;
a software processor configured to execute software processing for the transfer information acquisition circuit; and
a buffer circuit arranged between the arithmetic instruction number acquisition circuit and the transfer information acquisition circuit, the buffer circuit being configured to:
  relay the arithmetic instruction number and the arithmetic instruction;
  hold the arithmetic instruction number and the arithmetic instruction while the software processing is executed; and
  output to the transfer information acquisition circuit after the software processing is completed.

2. The transfer processing device according to claim 1, wherein:
  the arithmetic instruction identifier table is redundant in a first table and a second table;
  an error detection correction code is given to the arithmetic instruction identifier of the arithmetic instruction identifier table; and
  the arithmetic instruction number acquisition circuit is configured to detect whether there is an error in the arithmetic instruction identifier of the first table by the error detection correction code and to acquire the arithmetic instruction number by referring to the second table when there is the error in the arithmetic instruction identifier of the first table.

3. The transfer processing device according to claim 1, wherein:
  the transfer information table is redundant in a first table and a second table,
  an error detection correction code is given to the transfer information in the transfer information table; and
  the transfer information acquisition circuit is configured to detect whether there is an error in the transfer information of the first table by the error detection correction code and to acquire the transfer information by referring to the second table when there is the error in the transfer information of the first table.

4. The transfer processing device according to claim 3, wherein the buffer circuit is further configured to:
  when storing the arithmetic instruction, give information including the arithmetic instruction number and the error detection correction code before the arithmetic instruction, and
  when storing the arithmetic instruction, store the arithmetic instruction after securing a storage area of the information.

5. The transfer processing device according to claim 1, further comprising:
  an arithmetic instruction execution circuit configured to acquire the arithmetic instruction and execute the arithmetic instruction when the arithmetic instruction can be executed.

6. The transfer processing device according to claim 5, wherein
  the arithmetic instruction number acquisition circuit is configured to acquire the arithmetic instruction number and output the arithmetic instruction number with the arithmetic instruction when the arithmetic instruction execution circuit cannot execute the arithmetic instruction.

7. The transfer processing device according to claim 1, wherein:
  the transfer information or the arithmetic instruction includes a destination address or the transfer information acquisition circuit is configured to output the destination address separately from the transfer information or the arithmetic instruction; and
  the destination address is an address of a memory accessed by an arithmetic device that executes the arithmetic instruction.

8. A method comprising:
performing, by an arithmetic instruction number acquisition circuit, the following:
  acquire an arithmetic instruction identifier identifying an arithmetic instruction to be transferred;
  acquire an arithmetic instruction number corresponding to the arithmetic instruction identifier from an arithmetic instruction identifier table correlating arithmetic instruction identifiers with arithmetic instruction numbers; and output the arithmetic instruction number with the arithmetic instruction;
performing, by a transfer information acquisition circuit, the following:
  acquire the arithmetic instruction number and the arithmetic instruction out from the arithmetic instruction number acquisition circuit;
  acquire transfer information corresponding to the arithmetic instruction number from a transfer information table correlating arithmetic instruction numbers with transfer information; and
  output the transfer information corresponding to the arithmetic instruction number with the arithmetic instruction;
executing, by one or more processors, software processing for the transfer information acquisition circuit; and
performing, by a buffer circuit arranged between the arithmetic instruction number acquisition circuit and the transfer information acquisition circuit, the following:
  relays the arithmetic instruction number and the arithmetic instruction;
  hold the arithmetic instruction number and the arithmetic instruction while the software processing is executed; and
  output to the transfer information acquisition circuit after the software processing is completed.

9. The method according to claim 8, wherein:
the arithmetic instruction identifier table is redundant in a first table and a second table;
an error detection correction code is given to the arithmetic instruction identifier of the arithmetic instruction identifier table; and
the method further comprises detecting, by the arithmetic instruction number acquisition circuit, whether there is an error in the arithmetic instruction identifier of the first table by the error detection correction code and to acquire the arithmetic instruction number by referring to the second table when there is the error in the arithmetic instruction identifier of the first table.

10. The method according to claim 8, wherein:
the transfer information table is redundant in a first table and a second table,
an error detection correction code is given to the transfer information in the transfer information table; and
the method further comprises detecting, by the transfer information acquisition circuit, whether there is an error in the transfer information of the first table by the error detection correction code and to acquire the transfer information by referring to the second table when there is the error in the transfer information of the first table.

11. The method according to claim 10, wherein the method further comprises:
when storing the arithmetic instruction, giving, by the buffer circuit, information including the arithmetic instruction number and the error detection correction code before the arithmetic instruction, and
when storing the arithmetic instruction, storing, by the buffer circuit, the arithmetic instruction after securing a storage area of the information.

12. The method according to claim 8, further comprising:
acquiring, by an arithmetic instruction execution circuit, the arithmetic instruction and executing the arithmetic instruction when the arithmetic instruction can be executed.

13. The method according to claim 12, wherein the method further comprises:
acquiring, by the arithmetic instruction number acquisition circuit, the arithmetic instruction number and outputting the arithmetic instruction number with the arithmetic instruction when the arithmetic instruction execution circuit cannot execute the arithmetic instruction.

14. The method according to claim 8, wherein:
the transfer information or the arithmetic instruction includes a destination address or the transfer information acquisition circuit outputs the destination address separately from the transfer information or the arithmetic instruction; and
the destination address is an address of a memory accessed by an arithmetic device that executes the arithmetic instruction.

* * * * *